US 8,244,286 B2
Aug. 14, 2012

(12) United States Patent
Li et al.

(54) MOBILE COMMUNICATIONS DEVICE WITH INFORMATION FEEDBACK FUNCTION AND METHOD THEREOF

(75) Inventors: Xiao-Guang Li, Shenzhen (CN); Kuan-Hong Hsieh, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 553 days.

(21) Appl. No.: 12/400,791

(22) Filed: Mar. 9, 2009

(65) Prior Publication Data

US 2010/0029310 A1 Feb. 4, 2010

(30) Foreign Application Priority Data

Aug. 1, 2008 (CN) .......................... 2008 1 0303313

(51) Int. Cl.
  H04W 4/00 (2009.01)
  H04W 24/00 (2009.01)
  H04M 3/00 (2006.01)
  H04M 11/00 (2006.01)
  G06F 15/16 (2006.01)
  G06F 15/173 (2006.01)

(52) U.S. Cl. ..... 455/466; 455/407; 455/418; 455/456.6; 709/204; 709/206; 709/226

(58) Field of Classification Search .................. 455/466, 455/414.1, 407, 418, 456.6, 461; 709/204–206, 709/226

See application file for complete search history.

(56) References Cited

U.S. PATENT DOCUMENTS

| 7,103,372 | B1 * | 9/2006 | Kupsh ........................... 455/466 |
| 7,289,609 | B2 | 10/2007 | Ganani et al. |
| 7,496,922 | B2 * | 2/2009 | Muramatsu et al. .......... 719/312 |
| 7,751,836 | B2 * | 7/2010 | Bantukul et al. .............. 455/466 |
| 7,937,724 | B2 * | 5/2011 | Clark et al. ..................... 725/35 |
| 2006/0021031 | A1 * | 1/2006 | Leahy et al. .................... 726/22 |
| 2006/0148496 | A1 * | 7/2006 | Zhu et al. ....................... 455/466 |
| 2006/0206572 | A1 * | 9/2006 | Lalonde et al. ................ 709/206 |
| 2006/0242017 | A1 * | 10/2006 | Libes et al. ...................... 705/14 |
| 2007/0191032 | A1 * | 8/2007 | Doffman ........................ 455/466 |
| 2008/0097836 | A1 * | 4/2008 | Silanto et al. ................... 705/14 |
| 2008/0293393 | A1 * | 11/2008 | Hartmaier ................. 455/414.3 |
| 2009/0132718 | A1 * | 5/2009 | Groll et al. ...................... 709/229 |
| 2009/0203359 | A1 * | 8/2009 | Makhoul et al. ........... 455/412.2 |
| 2010/0022259 | A1 * | 1/2010 | Li et al. ........................... 455/466 |
| 2010/0041421 | A1 * | 2/2010 | Li et al. ........................... 455/466 |

FOREIGN PATENT DOCUMENTS

WO 2007019599 A1 2/2007

* cited by examiner

*Primary Examiner* — Marivelisse Santiago Cordero
*Assistant Examiner* — Mong-Thuy Tran
(74) *Attorney, Agent, or Firm* — Altis Law Group, Inc.

(57) ABSTRACT

A mobile communications device to provide feedback on spam text messages. A corresponding method is provided. The method includes steps of: receiving a message from a server; decoding the message; identifying whether the server ID of the received message is one of the predetermined numbers; displaying the menu on the display unit if the server ID is one of the predetermined numbers; receiving a reply code, generating a reply message corresponding to the reply code, and sending the reply message to the server.

5 Claims, 4 Drawing Sheets

1XXXX6:

Hello! customer, our company has held a activity for ......．

... ... ... ... ... ... ... ... ... ...

... ... ... ... ... ... ... ... ... ...

... ... ... ... ... ... ... ... ... ...

... ... ... ... ... ... ... ... ... 。

When fulling 100, sending 20, when fulling 200, sending 50, when fulling 300, sending 100, when taking part in the activity, sending A to 1XXXX6．

*Like (Y) Dislike (N) Reject (R)*

FIG. 3

MOBILE COMMUNICATIONS DEVICE WITH INFORMATION FEEDBACK FUNCTION AND METHOD THEREOF

BACKGROUND

1. Technical Field

The present disclosure relates to a mobile communications device with information feedback function and method thereof.

2. Description of Related Art

Commonly, mobile phones are not equipped to filter spam or junk text messages. The spam or junk messages takes up storage space, and wastes the time of the user to open and read the messages. Also, because the server involved in relaying the messages cannot distinguished between regular text messages and spam, the server will use up valuable time, and hence money, in sending the spam or junk messages.

Therefore, what is needed is a mobile communication device and method with an information feedback function.

BRIEF DESCRIPTION OF THE DRAWINGS

FIG. 3 is a schematic diagram showing a message received via electronic messaging service displayed on the mobile communications device of FIG. 1 or FIG. 2, in accordance with an exemplary embodiment.

DETAILED DESCRIPTION OF THE EMBODIMENTS

Figure 1:
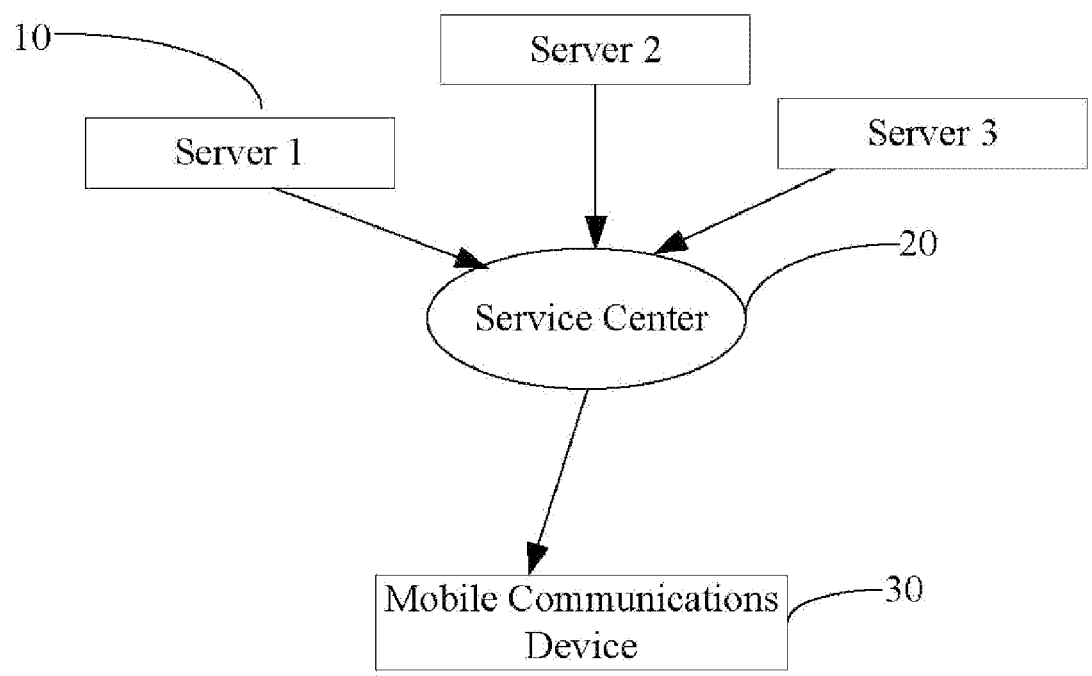
FIG. 1 is a schematic diagram of a system, including a communications device, for receiving and sending messages via an electronic messaging service in accordance with an exemplary embodiment.

FIG. 1 is a schematic diagram of a system, including a communications device, for receiving and sending messages in accordance with an exemplary embodiment. The system includes at least one server 10, a service center 20, and at least one mobile communications device 30. The server 10 is configured to generate messages such as advertisements (ads), and send the ads to the mobile communications device 30 through the service center 20. The service center 20 may use Short Messaging Service (SMS), Multimedia Messaging Services (MMS), Enhanced Message Service (EMS), and so on.

Figure 2:
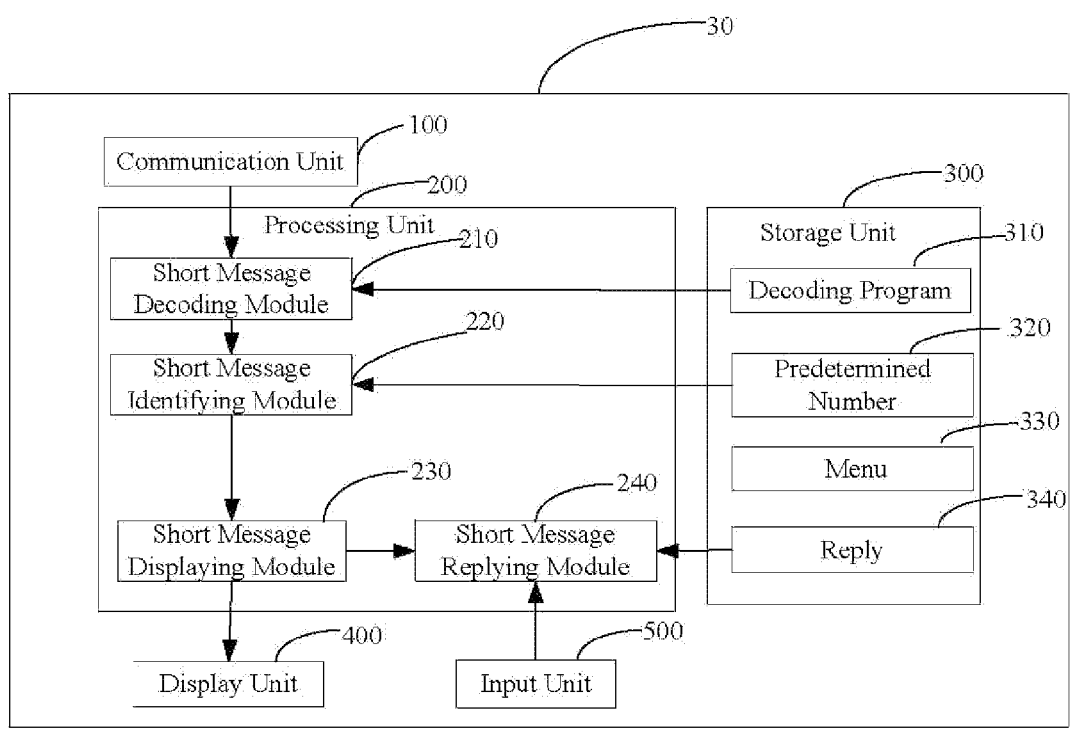
FIG. 2 is a block diagram of a hardware infrastructure of the mobile communications device of FIG. 1 in accordance with an exemplary embodiment.

FIG. 2 is a block diagram of a hardware infrastructure of the mobile communications device of FIG. 1 in accordance with an exemplary embodiment. The mobile communications device 30 includes a communication unit 100, a processing unit 200, a storage unit 300, a display unit 400, and an input unit 500. The communication unit 100 is configured to receive messages from the server 10, store the received messages in the storage unit 300 via the processing unit 200, and send a corresponding reply message to the server 10 if the received message is of a predetermined type such as an ad. The server 10 has an identification (ID) number.

The storage unit 300 stores a decoding program 310, a plurality of predetermined numbers 320, a menu 330, and a plurality of replies 340 corresponding to items of the menu 330. The decoding program 310 is configured to decode the received messages. The menu 330 is set by the server whose server ID number corresponding to one of the predetermined numbers 320. The menu 330 includes a plurality of menu items. For example, in the exemplary embodiment, the menu 330 includes three menu items: like (Y), dislike (N), reject (R), wherein the code in the bracket following the menu item is a reply code 340 corresponding to the menu item.

The display unit 400 is configured to display the message, and when the message is, for example, an ad, the display unit displays the menu as well. The input unit 500 is configured to allow selection of the menu items of the menu 330. The input unit 500 can be a keyboard, a touch screen, or a combination of a keyboard and a touch screen.

The processing unit 200 is configured for processing the received message according to the server ID number of the received message. For example, if the server ID number of the received message is not one of the predetermined numbers 320, the processing unit 200 processes the received message as a regular message, and allows user to respond in a usual manner such as deleting the message, replying to the message, forwarding the message, and the like. If the server ID number of the received message is one of the predetermined numbers 320, the processing unit 200 processes the received message in a predetermined manner as in the example described below.

The processing unit 200 includes a short message decoding module 210, a short message identifying module 220, a short message displaying module 230, and a short message replying module 240.

The short message decoding module 210 is configured to invoke a decoding program 310 from the storage unit 300 to decode received messages.

The short message identifying module 220 is configured to identify whether the server ID number of a received message is one of the predetermined numbers 320 after the short message decoding module 210 decodes the received message.

The short message displaying module 230 is configured to display messages and when the server ID number is one of the predetermined numbers to display the menu 330 as well. For example, in the exemplary embodiment as shown in FIG. 3, the short message displaying module 230 displays the menu 330 behind the ad or as a floating menu. Furthermore, the short message displaying module 230 displays the menu items in a predetermined displaying mode, which is different from the displaying mode of the ad content, to allow easier user recognition. For example, in the exemplary embodiment, the short message displaying module 230 displays the menu items of the menu in color and font different from the ad.

The mobile communications device 30 further provides two reply procedures to reply to predetermined types of messages such as ads. Each of the reply procedures defines processing steps for the user. For example, regarding a first reply procedure, the mobile communications device 30 provides a reply option for the user, and provides an editing interface for the user to edit the reply after the user chooses the reply option. The mobile communications device 30 sends the reply to the server 10 when the user finishes editing the reply. Regarding a second reply procedure, the mobile communications device 30 automatically generates a reply in response to the reply code input by the user, and sends the generated reply to the server 10.

The short message replying module 240 is configured to receive a reply code, generate a reply message corresponding the reply code, and send the reply message to the server 10 via the communication unit 100.

Figure 4:
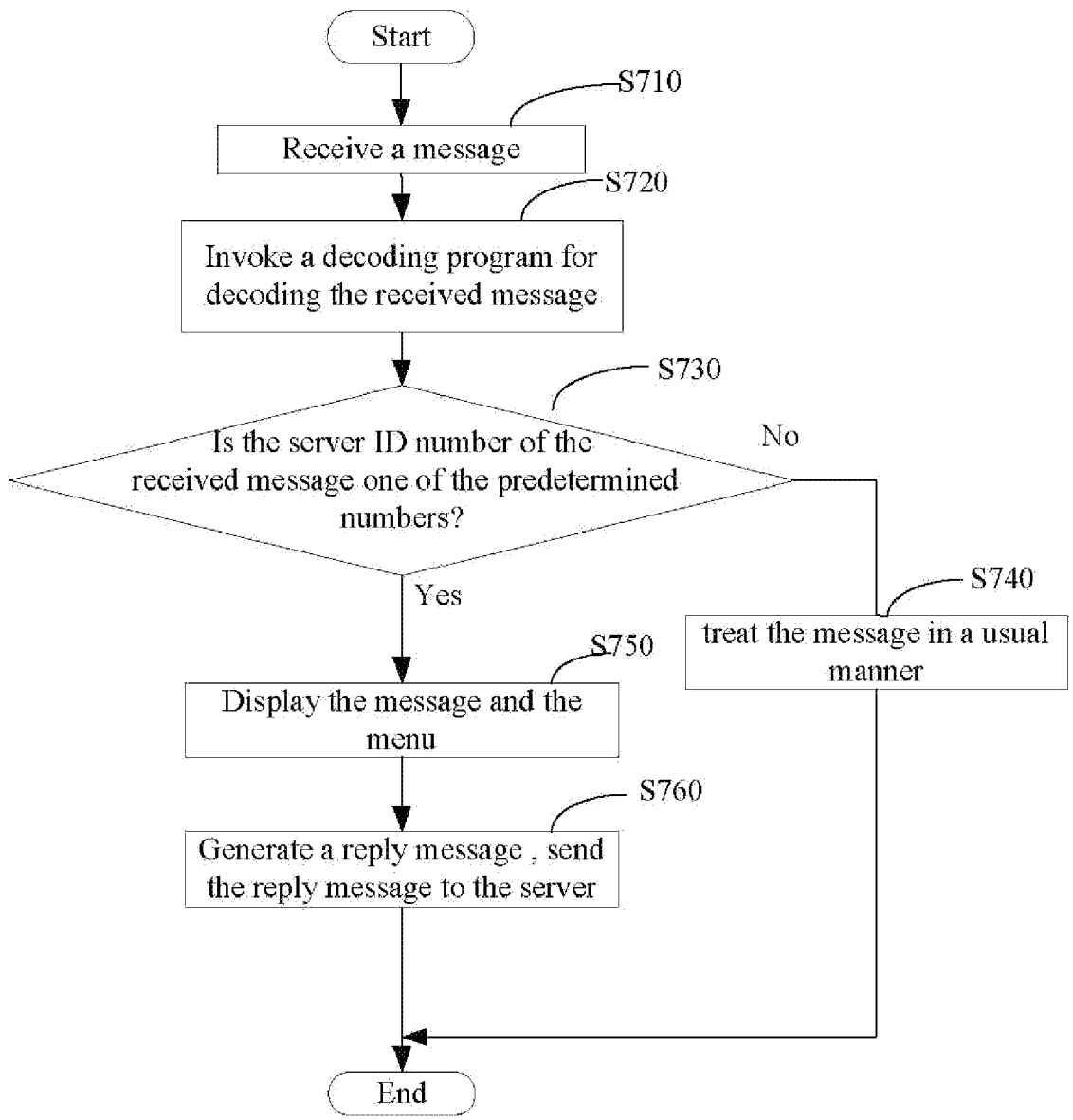
FIG. 4 is a flowchart of a message reply method implemented by the mobile communications device of FIG. 2 in accordance with an exemplary embodiment.

FIG. 4 is a flowchart of a message reply method implemented by the mobile communications device of FIG. 2 in accordance with an exemplary embodiment.

In step S710, the communication unit 100 receives a message from the server 10.

In step S720, the short message decoding module 210 invokes the decoding program 310 from the storage unit 300 to decode the received message.

In step S730, the short message identifying module 220 identifies whether the server ID number of the received message is one of the predetermined numbers after the short message decoding module 210 decodes the received message.

In step 740, the user treats the message in a usual manner if the server ID number of the received message is not one of the predetermined numbers 320.

In step 750, the short message displaying module 230 displays the message and when the server ID of the received message is one of the predetermined numbers 320 to display the menu.

In step 760, the short message replying module 240 receives a reply code, generates a reply message corresponding to the reply code, and sends the reply message to the server 10.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A mobile communications device with information feedback function, comprising:
 a communication unit configured to receive messages from a server, and sending a reply message to the server, wherein the server has an identification (ID) number;
 a storage unit configured to store the received messages, a decoding program, a plurality of predetermined numbers, a menu whose content is fixed and which is associated with each of the predetermined numbers, and a plurality of replies, wherein the menu comprises a plurality of menu items, and each of the menu items is assigned one reply of the plurality of replies;
 a display unit;
 an input unit configured to allow selection of the menu items of the menu; and
 a processing unit comprising:
  a short message decoding module configured to invoke a decoding program from the storage unit to decode the received message;
  a short message identifying module configured to identify whether a server ID number of the received message is one of the predetermined numbers;
  a short message displaying module configured to display messages and when the server ID number matches one of the predetermined numbers, the short message displaying module further configured to display the menu items in a predetermined displaying mode which is different from a displaying mode of an advertising message content; and
  a short message replying module configured to receive a reply code from the input unit, generating a reply message corresponding to the reply code, and sending the reply message.

2. The mobile communication device as in claim 1, wherein the input unit is selected from the group consisting of a keyboard, a touch screen, and a combination of a keyboard and a touch screen.

3. The mobile communication device as in claim 1, wherein each of menu items of the menu comprises a reply code.

4. A message reply method comprising:
 receiving a message from a server, wherein the server has an identification (ID) number, the message with the server ID number is assigned a menu whose content is fixed and which is associated with each of the predetermined numbers, and the menu comprises a plurality of menu items, each of the menu items is assigned a reply;
 decoding the received message according to a decoding program;
 identifying whether the server ID of the received message matches one of the predetermined numbers;
 displaying the message;
 displaying the menu items in a predetermined displaying mode which is different from a displaying mode of an advertising content if the server ID of the received message is one of the predetermined numbers; and
 receiving a reply code, generating a reply message corresponding to the reply code, and sending the reply message.

5. The method as described in claim 4, wherein each of menu items of the menu comprises a reply code.

* * * * *